(12) United States Patent
Kim et al.

(10) Patent No.: US 8,982,197 B2
(45) Date of Patent: *Mar. 17, 2015

(54) OPTICAL FILTER

(75) Inventors: Sin-Young Kim, Daejeon (KR); Moon-Soo Park, Daejeon (KR); Byoung-Kun Jeon, Daejeon (KR); Sang-Choll Han, Daejeon (KR); Bu Gon Shin, Daejeon (KR); Hyuk Yoon, Gyunggi-do (KR)

(73) Assignee: LG Chem, Ltd., Seoul (KR)

( * ) Notice: Subject to any disclaimer, the term of this patent is extended or adjusted under 35 U.S.C. 154(b) by 629 days.

This patent is subject to a terminal disclaimer.

(21) Appl. No.: 13/269,422

(22) Filed: Oct. 7, 2011

(65) Prior Publication Data

US 2012/0026305 A1 Feb. 2, 2012

Related U.S. Application Data

(63) Continuation-in-part of application No. 13/128,386, filed as application No. PCT/KR2010/000637 on Feb. 2, 2010, now Pat. No. 8,062,836.

(30) Foreign Application Priority Data

Feb. 3, 2009 (KR) .......................... 10-2009-008615

(51) Int. Cl.
*H04N 13/04* (2006.01)
*G02F 1/1335* (2006.01)
*G02B 5/30* (2006.01)
*G02B 27/22* (2006.01)
*G02B 27/28* (2006.01)

(52) U.S. Cl.
CPC .......... *H04N 13/0434* (2013.01); *G02B 5/3083* (2013.01)

USPC ........ 348/58; 348/E13.026; 349/15; 349/104; 359/462; 359/464; 359/465; 430/321; 430/396

(58) Field of Classification Search
USPC .................... 349/15, 104; 359/465, 462, 464; 348/58, E13.026; 430/321, 396
See application file for complete search history.

(56) References Cited

U.S. PATENT DOCUMENTS

| 6,320,629 B1 | 11/2001 | Hatano et al. | |
| 6,368,760 B1 | 4/2002 | Nishiguchi | |
| 8,062,836 B2* | 11/2011 | Kim et al. | 430/321 |
| 2011/0217638 A1* | 9/2011 | Kim et al. | 430/20 |

FOREIGN PATENT DOCUMENTS

| JP | 06-289374 | 10/1994 |
| JP | 10-153707 | 6/1998 |
| JP | 10-153707 A | 6/1998 |
| JP | 2001-159713 | 6/2001 |
| JP | 2003-194586 | 7/2003 |
| JP | 2004-287408 | 10/2004 |
| JP | 2005-049865 | 2/2005 |
| TW | 200628859 A | 8/2006 |
| TW | 200811599 | 7/2007 |
| TW | 200846724 | 12/2008 |
| TW | 200905265 | 2/2009 |
| TW | 2010001027 A | 1/2010 |

* cited by examiner

*Primary Examiner* — Shean C Wu
(74) *Attorney, Agent, or Firm* — McKenna Long & Aldridge LLP

(57) ABSTRACT

An optical filter for stereoscopic image display device and a stereoscopic image display device may be provided. In one embodiment, the optical filter for stereoscopic image display device may include a plastic substrate; an alignment layer; and a retardation layer, and the stereoscopic image display device may include the optical filter.

19 Claims, 7 Drawing Sheets

DRAWINGS

OPTICAL FILTER

CROSS-REFERENCE TO RELATED APPLICATIONS

This application is a Continuation-In-Part Application under 35 USC §120, of U.S. patent application Ser. No. 13/128,386, filed May 9, 2011, now U.S. Pat. No. 8,062,836 which is a national phase application of International Patent Application No. PCT/KR2010/000637, filed on Feb. 2, 2010, which claims the priority to and the benefit of Korean Patent Application No. 10-2009-0008615, filed on Feb. 3, 2009, which are incorporated by reference in their entirety herein.

BACKGROUND

Stereoscopic (three-dimensional or 3D) image display technology is technology that displays a 3D image as if the object actually exists in 3D space. 3D image display technology is expected to lead the next generation of display devices as a new concept in realistic image display technology improving on the level of planar visuals.

A 3D effect is realized via a procedure in which the left and right images of an object, perceived by the left and right eyes, are processed by the brain. Since a person's eyes are spaced apart by about 65 mm, they see images in two slightly different directions. At this time, a 3D effect is realized due to the optical phenomenon such as binocular disparity.

In order to display a 3D image, a 3D image display device may use a method of displaying stereoscopic images (3D image), that are slightly different images seen by an observer's respective left and right eyes. Such stereoscopic images can be displayed by way of the use of an eyeglasses method and an eyeglasses-free method. The methods for viewing a 3D image without wearing glasses include a parallax barrier method and a lenticular lens method. The parallax barrier method implements binocular disparity through a light shield layer having a structure in which barriers are regularly attached to the front or rear surface of a display panel. The lenticular lens method implements binocular disparity by using a small and regular semicylindrical lens called a lenticular lens. The two methods are advantageous in that glasses are not required; however, they are disadvantageous in that the effective viewing angle in which to obtain a 3D effect is significantly narrow, allowing only a single person to view a 3D image, and it is difficult to convert a 2D image into a 3D image.

The methods of viewing a 3D image while wearing glasses can be roughly divided into a shutter glasses method and a polarized glasses method. According to the shutter glasses method, the left-eye image and the right-eye image as displayed on a screen are alternately transmitted to each eye by the shutter glasses. An observer is able to separately recognize the left-eye image and the right-eye images alternately displayed on the screen due to the shutter glasses, and a 3D effect is obtained as the observer processes the two different images within his or her brain. However, the 3D display device using the shutter glasses method is disadvantageous in that the use of the shutter glasses increase the price of the product and an observer is directly exposed to electromagnetic waves generated by the driving of the shutter glasses.

According to the polarized glasses method, a patterned polarizer is mounted on an image display device. An observer experiences a 3D effect as a left-eye image and a right-eye image, having different polarization characteristics, are transmitted through the polarized glasses. The polarized glasses method is disadvantageous in that an observer must wear the polarized glasses, but is advantageous in that limitations on the viewing angle are small and the manufacturing thereof is easy.

The 3D image display device using the polarized glasses method may further include an optical film (optical filter) on the front surface of a screen display unit of a display device. As disclosed in U.S. Pat. No. 5,327,285, an optical film used in a 3D display device using the polarized glasses method, an optical film in which the right-eye image display unit and the left-eye image display unit are alternately disposed parallel to each other, is manufactured by coating a photoresist on a polarizing film in which a tri acetyl cellulose (TAC) film and an iodized stretched poly vinyl alcohol (PVA) film are laminated, exposing a predetermined portion, and by treating the exposed portion with a potassium hydroxide solution so that the function of phase difference of the predetermined portion is removed. Meanwhile, Korean Patent Application No. 2000-87186 discloses a method for manufacturing a 3D image display device. According to this patent application, a transparent substrate is coated with a birefringent material, and the birefringent material is subsequently partially exposed to light through a mask, thereby obtaining an optical filter (optical film) having portions in which chiral characteristics are modulated and portions in which original chiral characteristics are maintained, both of which are alternately arranged.

However, the manufacturing method disclosed in U.S. Pat. No. 5,327,285 is problematic in that it entails a complicated manufacturing step due to chemical etching, has high manufacturing costs, and has low productivity. The polarizing filter manufacturing method disclosed in Korean Patent Application No. 2000-0087186 is problematic in that it is actually somewhat difficult to control the chiral characteristics of the retarding material by using the intensity of light, resulting in low yield and instability according to temperature.

Therefore, there is a need for a method in which an optical filter for a 3D image display device with excellent process efficiency and productivity can be manufactured.

DETAILED DESCRIPTION OF THE PREFERRED EMBODIMENT

Figure 1:
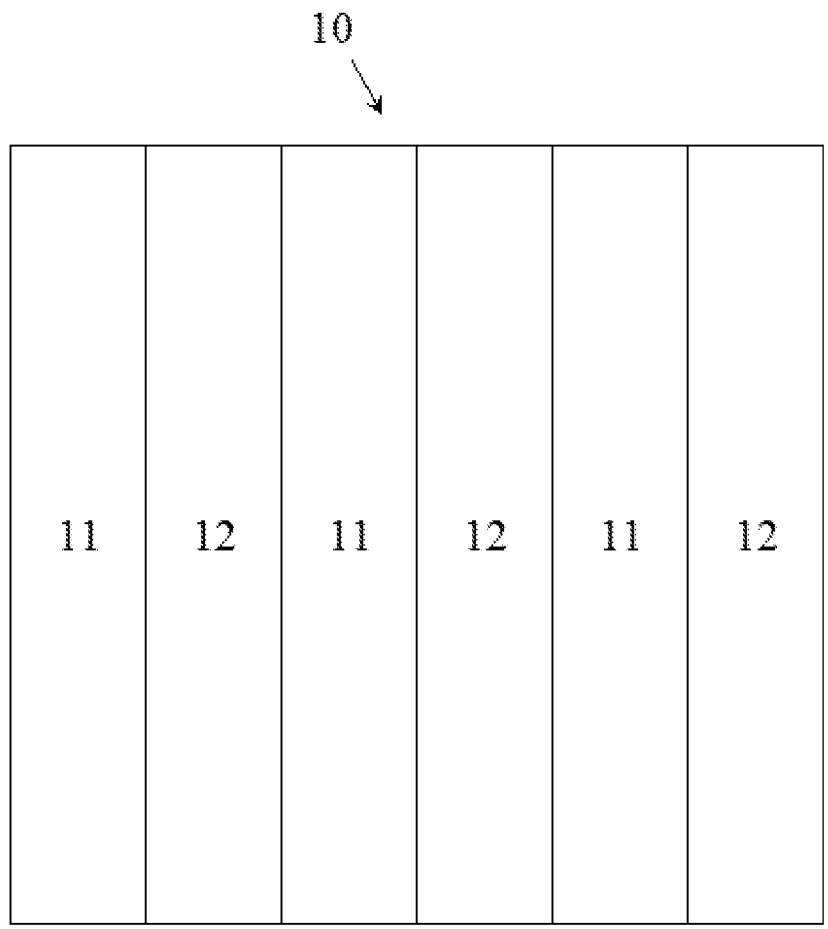
FIG. 1 shows a schematic of an illustrative embodiment of a retardation layer

Exemplary embodiments will now be described in detail with reference to the accompanying drawings. The embodiments may, however, be embodied in many different forms and should not be construed as being limited to the embodiments set forth herein. Rather, these embodiments are provided so that this disclosure will be thorough and complete, and will fully convey the scope to those skilled in the art.

In one embodiment, the optical filter for stereoscopic image display device may include a plastic substrate; an alignment layer and a retardation layer. In the above, the alignment layer may be formed on the substrate and may have different orientating directions according to a fine region thereof. The retardation layer may be formed on the alignment layer. Also, the retardation layer may include crosslinkable or polymerizable liquid crystal compounds in crosslinked or polymerized form.

Any kinds of a plastic substrate that is optically transparent may be used as the substrate in the filer. In one embodiment, as the substrate, a TAC (triacetyl cellulose) substrate, a COP (cycloolefin copolymer) substrate, a PES (poly(ether sulfone)) substrate, a PC (polycarbonate) substrate, a PEEK (polyetheretherketon) substrate, a Pac (polyacrylate) substrate such as a PMMA (poly(methyl methacrylate)) substrate, a PEI (polyetherimide) substrate, a PEN (polyethylenemaphthatlate) substrate, a polyester substrate such as a PET (poly(ethylene terephthalate) substrate, a PI (polyimide) substrate, a PS (polysulfone) substrate, a PVA (polyvinylalcohol) substrate, or a fluoropolymer substrate may be used.

In one embodiment, the substrate may be an optically isotropic substrate or an optically anisotropic substrate. In case where the substrate is an optically anisotropic substrate, the substrate may be a –C plate. The term "–C plate" as used herein may refer to a property satisfying the relation of "$n_x=n_y>n_z$," or the substrate having the above property. The mark "$n_x$" as used herein may refer to a refractive index of the plate or the substrate along its slow axis direction in a plane, the mark "$n_y$" as used herein may refer to a refractive index of the plate or the substrate along its fast axis direction in a plane, the mark "$n_y$" as used herein may refer to a refractive index of the plate or the substrate along its thickness direction. The refractive indices may be evaluated with respect to light having a wavelength of approximately 550 nm or 589 nm.

In another embodiment, in case where the substrate is an optically anisotropic substrate, the plastic substrate may have a $R_{th}$ retardation value in the range of approximately 300 nm or less, preferably approximately 200 nm, more preferably approximately 100 nm or less, further more preferably approximately 60 nm or less and still more preferably approximately 15 nm or less. The term "$R_{th}$ retardation value" as used herein may refer to a value calculated by "$\{(n_x+n_y)/2-n_z\}\times d$." The plastic substrate may have a $R_e$ retardation value in the range of 10 nm or less and preferably approximately 5 nm or less. The term "$R_e$ retardation value" as used herein may refer to a value calculated by "$(n_x-n_y)\times d$." In the above, the mark "d" means a thickness of the substrate or the plate.

In case where the substrate is an optically anisotropic substrate, if its properties are controlled as described above, it may become possible to maximize the performance of the retarder in the device with minimizing the crosstalk, and for the stereoscopic device to have improved performances such as an excellent brightness and contrast ratio properties.

In one embodiment, the plastic substrate may have a refractive index lower than the retardation layer. If the substrate has a refractive index lower than the retardation layer, it may become possible to secure anti-reflection property and to improve the performances of the device such as an excellent brightness and contrast ratio properties. In one embodiment, the substrate may have a refractive index in the range of 1.33 to 1.53.

In one embodiment, the plastic substrate may include an ultraviolet absorbing agent. If the substrate includes an ultraviolet absorbing agent, it may become possible to prevent ultraviolet rays from entering into the device or the retardation layer, and therefore to improve the durability thereof. As the ultraviolet absorbing agent, organic compounds such as salicyclic acid ester compound, benzophenone compound, oxybenzophenone compound, benzotriazol compound, cyanoacrylate compound and/or benzoate compound; and/or inorganic compounds such as zinc oxide or nickel complex salt may be exemplified, but is not limited thereto. The ultraviolet absorbing agent may be included in the substrate in an amount of from 0.1 weight % to 25 weight %, but is not limited thereto.

As the alignment layer, any conventional alignment layer such as a rubbing alignment layer or a photo alignment layer may be used. In one embodiment, the alignment layer may be a photo alignment layer. The photo alignment layer may include compounds, of which the orientating direction can be determined by a cis-trans isomerization reaction, a fries rearrangement reaction and/or a dimerization reaction induced by irradiation of light such as linearly polarized ultraviolet rays, and then which can induce the orientation of adjacent liquid crystal by the determined orientating direction thereof. For example, the alignment layer may include monomer, oligomer or polymer compound having at least one functional group or moiety selected from the group consisting of an azobenzene, a styryl benzene, a cumarine, a chalcone, fluorine and a cinnamate, and may preferably include norbonene resin having at least one cinnamate moiety.

Methods to form the alignment layer on the substrate are not particularly limited, but, for example, a method, in which the above described compound is diluted by appropriate solvents and then coated on the substrate by conventional coating method such as roll coating, spin coating or bar coating. Also, the coating thickness of the alignment layer is not particularly limited.

In one embodiment, the retardation layer may include at least one first region and at least one second region. In the above, one of the first and second regions may be a region through which an image light for a right eye transmitted from the device may pass, and the other of the first and second regions may be a region through which an image light for a left eye may pass.

In one embodiment, an image light after passing through one of the first and the second region may be a left-circularly polarized light and an image light after passing through the other of the first and the second region may be right-circularly polarized light.

In the above case, the first and second regions are quarter wave plates, and the optical axis of the quarter wave plate of the first region may have a direction different from that of the quarter wave plate of the second region. The term "optical axis" as used herein may refer to a fast axis or a slow axis. Hereinafter, the direct of the optical axis of the quarter wave plate of the first region may be referred to as a "first direction," and the direct of the optical axis of the quarter wave plate of the second region may be referred to as a "second direction." In one embodiment, the first direction may form an angle of substantially 90 degrees with the second direction.

In one embodiment the first region and the second region may have stripe shape extending in a common direction, and be alternately arranged in a short side direction of the stripe shape. FIG. 1 is a drawing that shows illustrative example of the retardation layer observed from the upper side thereof. In the retardation layer 10 of FIG. 1, the first region 11 and the second region 12 have stripe shape extending in a common direction respectively, and they are alternately arranged in a short side direction of the stripe shape.

Methods for preparing the optical filter are not particularly limited, but any conventional methods can be used.

In one embodiment, the optical filter for stereoscopic image display device may be prepared by a method that includes forming a coating layer including at least one photo-orientable compound on the plastic substrate; photo-orientation comprising positioning a patterned mask above the coating layer, positioning a polarizer above the patterned mask, and downwardly irradiating UV light onto the coating layer from above the polarizer, thereby forming the alignment layer having different orientating directions according to a fine region thereof; and forming the retardation layer on the alignment layer. In the above, the patterned mask may have alternating light transmission regions and light shield regions both in horizontal and vertical directions to selectively transmit different polarized light. Also, the polarizer may have two distinguishable regions that transmit different polarized light.

In another embodiment, the optical filter for stereoscopic image display device may be prepared by a method that includes forming a coating layer including at least one photo-orientable compound on the plastic substrate; photo-orienting comprising positioning a patterned mask above the coating layer, positioning a polarizer above the patterned mask, and irradiating ultraviolet light onto the coating layer from the upper side of above the polarizer, thereby forming the alignment layer having different orientation directions in fine regions thereof; and forming the retardation layer on the alignment layer. In the above, a first stage pattern having at least one light transmission region and at least one light shield region which alternate in a horizontal direction, and a second stage pattern having at least one light transmission region and at least one light shield region which alternate in a horizontal direction may be perpendicularly formed in the patterned mask, and the light transmission region and the light shield region of the first stage pattern and the light transmission region and the light shield region of the second stage pattern may alternate with each other in a vertical direction so that the light shield region of the second stage pattern may be positioned below the light transmission region of the first stage pattern and the light transmission region of the second stage pattern may be positioned below the light shield region of the first stage pattern. Also, the polarizer may have two distinguishable regions, each of which transmits differently polarized light to each other. Also, the patterned mask and the polarizer may be positioned during the irradiation of the ultraviolet light on the coating layer such that the polarized light which passes through one region of the polarizer passes only through the light transmission region of the first stage pattern and is then irradiated onto the coating layer, and the polarized light which passes through the other region of the polarizer passes only through the light transmission region of the second stage pattern and is then irradiated onto the coating layer.

Conventionally, if a plastic substrate is used for the substrate of the optical filter, it may be possible to provide the optical filter which is light-weight and thin and has an excellent flexibility. However, because of the inherent property of the plastic substrate, it is not easy to form orientating patterns having high degrees of accuracy, since the substrate may be affected by forming temperature, solvents, expansion and/or contraction of the alignment layer during the preparing process. However, if the methods as described above are used, it may become possible to maximize the advantage of the plastic substrate without inducing the above problems.

Also, by the above methods, different orientations may be assigned according to a fine region of the alignment layer via one-time continuous light irradiation.

Figure 2:
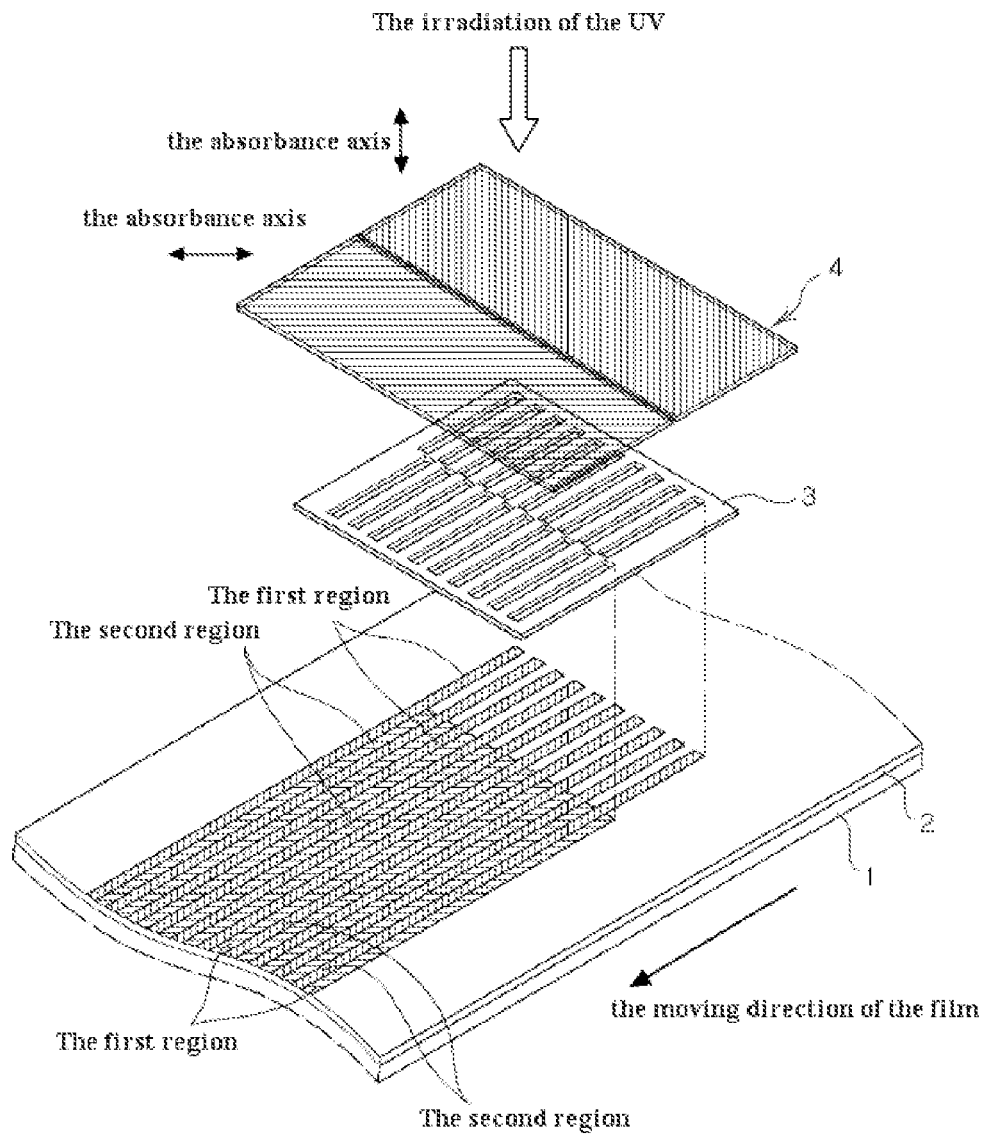
FIG. 2 shows a schematic of an illustrative embodiment of a photo-orientation step in a method for manufacturing an optical filter

In the method, the coating layer may be formed on the substrate, and differently polarized light may be irradiated according to a region of the coating layer via a one-time continuous photo orientation step. As a result of that, different orientations are formed according to a fine region of the alignment layer. Then, an optical filter may be prepared by forming a retardation layer, for example by using crosslinkable or polymerizable liquid crystal layer compound on the alignment layer having different orientations according to the region. FIG. 2 illustrates one exemplary method for manufacturing the optical filter, specifically, a process for forming the alignment layer having different orientating directions according to the fine regions thereof.

As illustrated in FIG. 2, the coating layer 2 may be formed on the plastic substrate 1. The coating layer 2 may include a photo-orientable compound, such as monomer, oligomer or polymer compound having at least one functional group or moiety selected from the group consisting of an azobenzene, a styryl benzene, a cumarine, a chalcone, fluorine and a cinnamate as described above, whose orientation may be assigned by light irradiation. In one embodiment, the coating layer may include at least one compound selected from the group consisting of polyamide, polyimide, poly(vinyl alcohol), poly(amic acid), and poly cinnamate as the photo-orientable compound, however, is not limited thereto.

The alignment layer may be formed by irradiating polarized light onto the coating layer 2 in order to assign orientations thereto. The optical filter has different orientations according to a predetermined region in order to form images with different polarization characteristics. Therefore, the photo orientation step for forming the alignment layer with different orientations according to the region may be performed by using a mask having a pattern through which differently polarized light can be selectively transmitted according to the region of the coating layer. In one embodiment, the patterned mask has at least one light transmission region and at least one light shield region that alternate with each other both in a horizontal direction and in a vertical direction, so that different polarized light may be selectively transmitted. One or two or more of the patterned mask may be used depending on the pattern formed on the mask.

Figure 3:
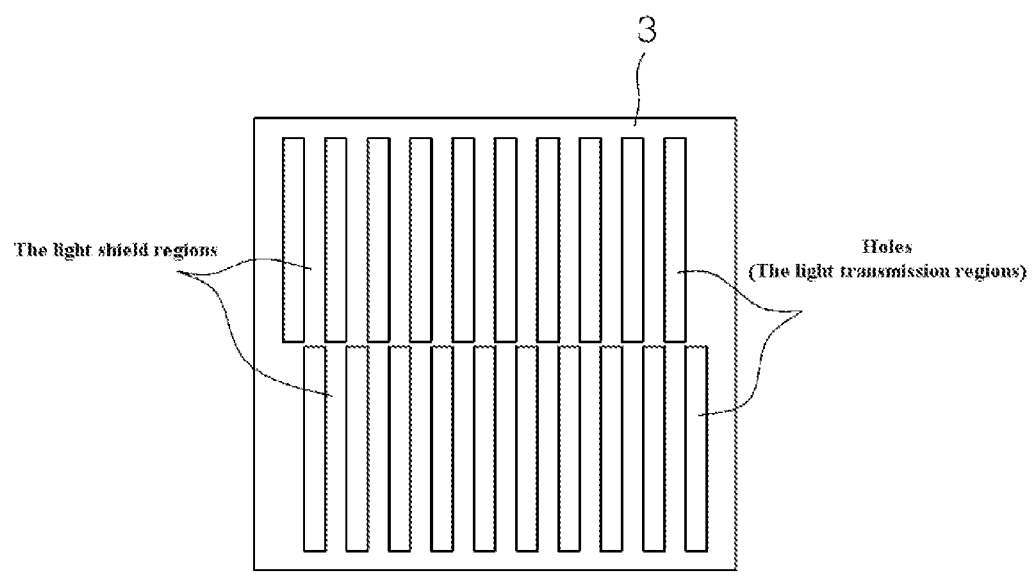
FIGS. 3 to 5 show a schematic of an illustrative embodiment of a patterned mask

FIG. 3 shows a schematic of an illustrative embodiment of a patterned mask which may be used.

The patterned mask of FIG. 3 includes a first stage pattern that comprises at least one light transmission region and at least one light shield region which alternate with each other in a horizontal direction; a second stage pattern that comprises at least one light transmission region and at least one light shield region which alternate with each other in a horizontal direction and are located below the light transmission region and the light shield region of the first stage pattern, such that the light shield region of the second stage pattern is positioned below the light transmission region of the first stage pattern and the light transmission region of the second stage pattern is positioned below the light shield region of the first stage pattern. In the case of the patterned mask illustrated in FIG. 3, one of the patterned mask having alternating at least one light transmission region and at least one light shield region in both a horizontal direction and a vertical direction is used. Therefore, as illustrated in FIG. 2, the alignment layer having different orientating directions according to a fine region of the coating layer can be formed. If necessary, two or more of the patterned mask illustrated in FIG. 3 may be used.

Figure 4:
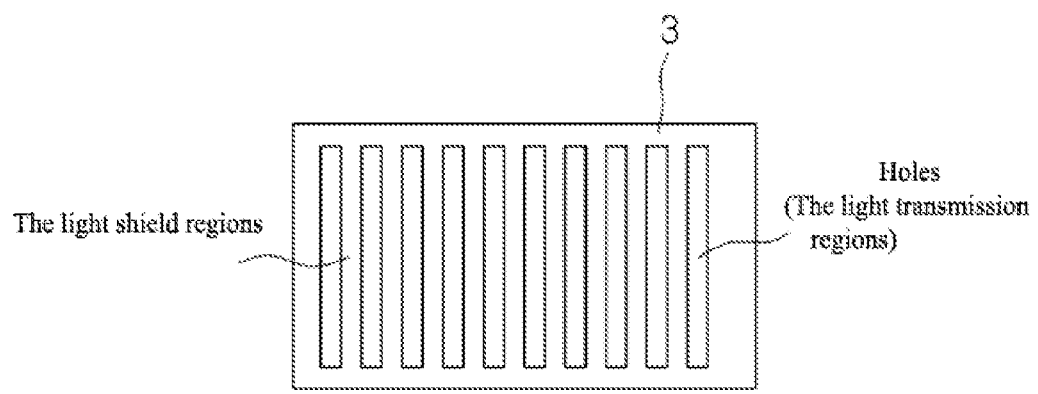
Figure 5:
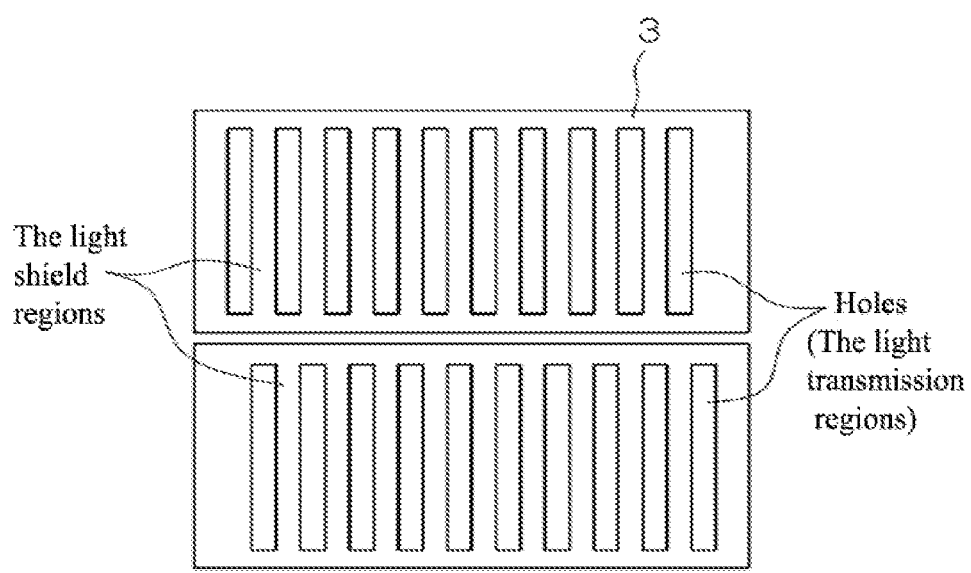

Furthermore, as illustrated in FIG. 4, two sheets of a patterned mask having alternating at least one light transmission region and at least one light shield region may be used to provide the mask pattern as illustrated in FIG. 3. In this way, the alignment layer having different orientating directions according to a fine region of the coating layer may be formed. FIG. 5 illustrates a state in which two sheets of the patterned mask illustrated in FIG. 4 are arranged. That is, as illustrated in FIG. 5, the patterned mask of FIG. 4 may be used in such a manner that the light transmission regions and the light shield regions alternate in a vertical direction. If necessary, three or more sheets of the patterned mask illustrated in FIG. 4 may be used.

Although not limited thereto, for example, as illustrated in FIG. 2, the patterned mask 3 having the pattern of FIG. 3 may be positioned on the coating layer 2, or two of the patterned mask 3 having the pattern of FIG. 4 may be positioned above the coating layer 2 such that they may be positioned as in FIG. 5, and then a UV (ultraviolet) polarizer 4 having two regions, each of which transmit differently polarized light is positioned above the patterned mask 3 parallel to the moving direction of the film. Then, while moving the coating layer along the moving direction of the film in FIG. 2, UV light may be irradiated downward from above the UV polarizer 4 through the UV polarizer and the patterned mask 3 to the coating layer 2. Thus, differently polarized UV light may be selectively irradiated onto the first region and the second region of the coating layer. Accordingly, the alignment layer, in which predetermined regions with different orientating directions are alternately formed, may be obtained. More specifically, in the alignment layer illustrated in FIG. 2, the first region and the second region, in which the compounds are aligned in different orientating directions, are alternately formed in a lengthwise direction.

Then the retardation layer is formed on the alignment layer. The retardation layer may be formed by coating and cross-linking or polymerizing crosslinkable or polymerizable liquid crystal compound. In one embodiment, the liquid crystal compound may be a nematic liquid crystal compound. The nematic liquid crystal compound may be a polymerizable and reactive compound. The nematic liquid crystal may be crosslinked or polymerized with an adjacent liquid crystal compound by light so as to form a liquid crystal polymer. The nematic liquid crystal may include any kind of a nematic liquid crystal which is generally known as a material used to form the retardation layer in the arts. In one embodiment, one or more kinds of materials having an acrylate group, which is polymerizable or crosslinkable by photoreaction, may be used. Examples of the liquid crystal material may include a liquid crystal compound exhibiting a nematic phase at room temperature or high temperature, such as cyano biphenyl acrylate, cyano phenyl cyclohexane acrylate, cyano phenyl ester acrylate, benzoic acid phenyl ester acrylate, phenyl pyrimidine acrylate, and a mixture thereof.

The coating solution including the polymerizable or crosslinkable liquid crystal compounds may be coated on the alignment layer as an isotropic material state and may be then phase-transitioned to a liquid crystal by polymerization and/or crosslinking during drying and curing processes. Therefore, the liquid crystal compound may be aligned in a specific direction, for example, absorbance axis direction of the UV polarization direction and its orientating direction may be fixed. Therefore, the optical axes of the nematic liquid crystal compound having the optical anisotropy may be differently orientated according to a fine region on the alignment layer that has different orientating directions according to a fine region, and the polarization direction of light which has passed through the fine region is differently controlled. Furthermore, the orientation of the liquid crystal compound may be not changed in subsequent processes, even though another layer is laminated on the retardation layer.

In forming the retardation layer, the coating thickness of the coating solution may be adjusted so that the retardation layer has an appropriate phase retardation value. Meanwhile, the retardation layer may be formed to have a phase difference value of half wave plate in order for conversion to a linearly polarized light, or have a retardation value of quarter wave plate in order for conversion to circularly polarized light as described above.

In the method for manufacturing the optical filter according to the above embodiments, except for forming the alignment layer in which the fine regions with different orientating directions are alternately formed by using the specific mask and the polarizer having two regions, which transmit differently polarized light to each other, the coating layer, the kind of liquid crystal, the materials used to form the coating layer and the retardation layer, the forming method thereof, and the thickness of the coating layer as well as the retardation layer are common in the art and may be selectively applied in order to exhibit desired optical characteristics, but is not limited thereto.

In still another embodiment, a stereoscopic image display device that includes the optical filter as described above may be provided. The stereoscopic image display may further include an element for displaying images capable of transmitting image signals comprising an image light for a right eye or an image light for a left eye, and a first polarizer that is arranged so that the image signals transmitted from the element for displaying images can enter, and that has an light absorption axis. The optical filter may be arranged so that the image signals transmitted from the element for displaying images can ether via the first polarizer.

The stereoscopic image display device may be a device observed with polarized glasses.

Figure 6:
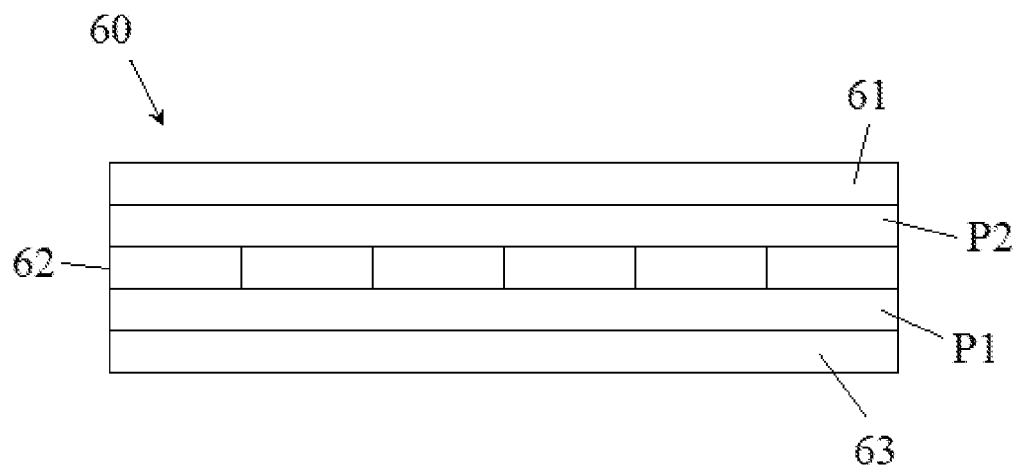
FIG. 6 shows a schematic of an illustrative embodiment of a stereoscopic image display device

FIG. 6 is a cross sectional drawing of one illustrative example of the device according to an embodiment.

The display device 60 may be configured by sequentially arranging a light source 61, the element for displaying images 62 such as a liquid crystal display panel, and the optical filter 63. In the above, the optical filter may be arranged so that the retardation layer may be positioned closer to the element 62 than the plastic substrate.

The light source may be a backlight unit that includes, for example, a reflective plate, a light source and at least one optical sheet. The reflective plate returns light emitted from the light source to an optical sheet side, and has functions of reflection, scattering, diffusion and the like. The reflective plate includes, for example, PET (Polyethylene Terephthalate) foam. Thus, light emitted from the light source may be efficiently used. The light source irradiates the element 62 from the back, and may include, for example, a plurality of linear light sources arranged in parallel at constant intervals, or a plurality of point-like light sources arranged in a two-dimensional array. In addition, as the linear light source, for example, a hot cathode fluorescent lamp (HCFL), a cold cathode fluorescent lamp (CCFL) or the like is listed. As the point-like light source, for example, a light emitting diode (LED) or the like is listed. The optical sheet equalizes in-plane luminance distribution of light from the light source, or adjusts an angle of divergence and a polarization state of light from the light source into a desired range, and includes, for example, a diffusion plate, a diffusion sheet, a prism sheet, a reflective polarizing element, and a phase difference plate. Further, the light source may be of an edge light type. In such a case, a light guide plate or a light guide film is used as necessary.

The element may be a transmissive liquid crystal display panel in which a plurality of pixels are two-dimensionally arranged in row and column directions, and drives each pixel in accordance with a picture signal for image display. As described above, the pixels may include, for example, the pixel for a left eye and the pixel for a right eye. The element 62 may have, for example, a transparent substrate, pixel electrodes, an alignment film, a liquid crystal layer, an alignment film, a common electrode, a color filter and a transparent substrate (counter substrate) in order from the light source 61 side.

The first polarizer P1 may be dispose on a light emitting side of the element 62. Also, the device 60 may further include second polarizer P2 that is disposed on a light incidence side of the element 62. The polarizers P1 and P2 are a kind of optical shutter, and transmits only light (polarized light) in a certain vibration direction. For example, the polarizers P1 and P2 may be disposed such that the light absorption axes thereof are different by a certain angle, for example, 90 degrees, from each other, so that emitted light from the light source 61 may be transmitted or blocked.

In one embodiment, as described above, the retardation layer of the optical filter may include at least one first region which may be the quarter wave plate and may have an optical axis in a first direction and at least one second region which may be also the quarter wave plate and may have an optical axis in a second direction that is different from the first direction.

In the above case, a bisector of the angle formed by the first and second directions may be substantially perpendicular or horizontal to the light absorption axis of the first polarizer P1.

Figure 7:
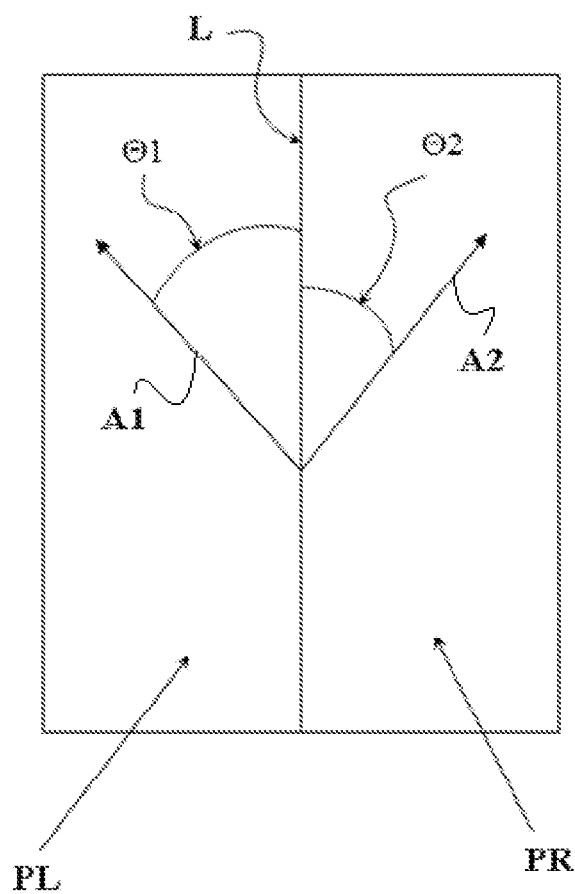
FIG. 7 shows a schematic of an illustrative embodiment of the arrangement of optical axes

FIG. 7 is an illustrative drawing for explaining the direction of the optical axes.

In FIG. 7, the optical axis formed in the first direction in the first region PR is denoted as "A1," and the optical axis formed in the second direction in the second region PL is denoted as "A2."

The optical axes A1 and A2 may be formed so that the bisector of the angle formed by them may be substantially perpendicular or horizontal to the light absorption axis of the first polarizer P1. If the optical axes A1 and A2 form as above, the image signals emitted from the first polarizer can be exactly transformed to left-circularly polarized light and right-circularly polarized light, respectively. Therefore, it may become possible to prevent a so-called "cross-talk" from being generated and to improve the quality of the stereoscopic image.

The term "bisector of the angle formed by the first and second directions" as used herein may refer to a bisector of the angle of "θ1+θ2" or "360−(θ1+θ2)" in FIG. 7.

In one embodiment, the angle formed by the first and second directions, i.e., "θ1+θ2" or "360−(θ1+θ2)" in FIG. 7, may be substantially 90 degrees.

Hereinafter, the embodiment of the present invention will be described. The following embodiment is an exemplary implementation example which will help with understanding the present invention, but the present invention is not limited thereto.

As illustrated in FIG. 1, a coating layer 2 of polycinnamate having a dry thickness of 1,000 Å was formed on a triacetyl cellulose substrate 1 having a thickness of 80 μm.

The coating layer 2 of polycinnamate was formed by coating a solution for forming the coating layer on the triacetyl cellulose substrate 1, that has a thickness of 80 μm, such that the coating layer had a thickness of 1,000 Å after being dried by using a roll coating method, and removing solvent from the inside of the coating layer by heating at 80° C. for 2 minutes in an oven. At this time, as the solution for forming the coating layer, solution that was prepared by mixing a mixture of polynorbornene (weight average molecular weight ($M_w$)=150,000) having a cinnamate group, which is represented by a chemical formula 1 below and acrylate monomers with photoinitiator (Igacure 907) and dissolving the resulting mixture in a cyclohexanone solvent so that the solid content of the polynorbornene became 2 weight % was used. Also, the weight ratio of polynorbornene:acrylate monomer:photoinitiator was 2:1:0.25. As the solvent, cyclopentanone may also be used instead of the cyclohexanone.

Chemical Formula 1

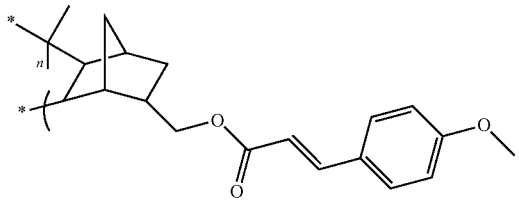 [SMILES: *C1C2CC(CC2COC(=O)/C=C/c2ccc(OC)cc2)C1C(*)(C)C]

Then, the patterned mask 3 (100 mm×100 mm) which had a pattern as in FIG. 2, and in which the light transmission regions had a width of 500 μm and light transmission regions and light shield regions alternated with each other in both a horizontal direction and a vertical direction was placed on the coating layer 2 of polycinnamate.

In the patterned mask 3, the width of the light transmission region should be matched with the pixel interval in the display device in which the manufactured optical filter is to be used. For example, the width of the light transmission region may be an interval of about 300 μm for a monitor, and may be an interval of about 450 μm for a TV, but it is not limited thereto. In the mask pattern, there is no special limitation on the length of the light transmission region. Those skilled in the art can suitably adjust the length of the light transmission region in consideration of the amount of light necessary for orientation and convenience in photo-orientation.

Then, as illustrated in FIG. 1, a UV polarizer 4 having two regions, each of which transmit different polarized light was positioned over the patterned mask 3 parallel to the moving direction of the film. Thereafter, UV light having an intensity of 300 mW/cm$^2$ was continuously irradiated downwards from above the UV polarizer 4 for 30 seconds, while substrate was moved at a speed of 3 m/min in the moving direction of the film of FIG. 1, thereby obtaining the alignment layer in which at least one first orientation region and at least one second orientation region having polymers aligned in different directions along a predetermined region of the coating layer 2 of polycinnamate are alternately formed along a lengthwise direction of the coating layer.

As the liquid crystal material, LC242™, commercially available from the BASF Company, was coated to have a dry thickness of about 1 μm, and the liquid crystal was cured by irradiating UV light having an intensity of 300 mW/cm$^2$ upon it for 10 seconds, thereby forming a retardation layer. As the liquid crystal material, Reactive Mesogen (RM) based materials may also be used. Since the retardation layer was formed on the alignment layer in which polymers were aligned in different orientating directions in the fine regions, the optical axes of the optical anisotropic material are differently aligned in the fine regions. As a result, an optical filter for a 3D image display device was obtained.

When light passes through the optical filter according to the embodiment of the present invention, in which the optical axes of the liquid crystal are differently aligned and fixed in the fine regions, the light polarization direction is differently controlled, depending on the transmission regions of the optical filter. Therefore, since the left-eye image and the right-eye image with different polarization characteristics as emitted through the polarization filter, are projected through the polarized glasses, the observer recognizes a 3D effect via the polarized glasses method.

In the method for manufacturing the optical filter for the 3D image display device, the patterned mask in which the light transmission region and the light shield region alternately intersect vertically and horizontally and the polarizer having two distinguishable regions transmitting different polarized light are used in order that different polarized light is selectively transmitted. Therefore, the fine regions of the coating layer are alternately arranged in different orientating directions by the continuous photo-orientation process via one-time continuous light irradiation.

Therefore, an alignment layer in which the fine regions with different orientating directions are formed alternately and continuously is obtained. Since such an alignment layer is formed by a one-time continuous photo-orientation process, the photo-orientation process and the method for manufacturing the optical filter are simplified in comparison with the conventional art. As a result, the process yield and productivity in the manufacturing of the optical filter for the 3D image display device are improved.

While the present invention has been shown and described in connection with the exemplary embodiments, it will be apparent to those skilled in the art that modifications and variations can be made without departing from the spirit and scope of the invention as defined by the appended claims.

What is claimed is:

1. An optical filter for stereoscopic image display device that comprises a plastic substrate; an alignment layer that is formed on the substrate; and a retardation layer that is formed on the alignment layer.

2. The optical filter for stereoscopic image display device according to claim 1, wherein the plastic substrate is a triacetyl cellulose substrate, a cycloolefin polymer substrate, a poly(ether sulfone) substrate, a polycarbonate substrate, a polyetheretherketon substrate, a polyacrylate substrate, a polyetherimide substrate, a polyethylenenaphthatlate substrate, a polyester substrate, a polyimide substrate, a polysulfone substrate, a polyvinylalcohol substrate, or a fluoropolymer substrate.

3. The optical filter for stereoscopic image display device according to claim 1, wherein the plastic substrate is an optically anisotropic substrate.

4. The optical filter for stereoscopic image display device according to claim 3, wherein the plastic substrate is a –C plate.

5. The optical filter for stereoscopic image display device according to claim 3, wherein the plastic substrate has a Rth retardation value in the range of 300 nm or less.

6. The optical filter for stereoscopic image display device according to claim 3, wherein the plastic substrate has a Re retardation value in the range of 10 nm or less.

7. The optical filter for stereoscopic image display device according to claim 1, wherein the plastic substrate has a refractive index lower than the retardation layer.

8. The optical filter for stereoscopic image display device according to claim 1, wherein the plastic substrate has a refractive index in the range of 1.33 to 1.53.

9. The optical filter for stereoscopic image display device according to claim 1, wherein the plastic substrate comprises an ultraviolet absorbing agent.

10. The optical filter for stereoscopic image display device according to claim 1, wherein the alignment layer comprises at least one first orientation region and at least one second orientation region, of which orientating directions are different from each other and which are alternately formed.

11. The optical filter for stereoscopic image display device according to claim 1, wherein the retardation layer comprises crosslinkable or polymerizable liquid crystal compound in crosslinked or polymerized form.

12. The optical filter for stereoscopic image display device according to claim 1, wherein the retardation layer comprises at least one first region having an optical axis in a first direction and at least one second region having an optical axis in a second direction that is different from the first direction.

13. The optical filter for stereoscopic image display device according to claim 12, wherein the first and second regions are quarter-wave plates.

14. The optical filter for stereoscopic image display device according to claim 12, wherein the first and the second regions have stripe shape extending in a common direction respectively, and are alternately arranged in a short sided direction of the stripe shape.

15. The optical filter for stereoscopic image display device according to claim 1, prepared by a method comprising forming a coating layer on the plastic substrate; photo-orientation comprising positioning a patterned mask above the coating layer, the patterned mask having alternating light transmission regions and light shield regions both in horizontal and vertical directions to selectively transmit different polarized light, positioning a polarizer above the patterned mask where the polarizer has two distinguishable regions that transmit different polarized light, and downwardly irradiating ultraviolet ray on the coating layer from above the polarizer, thereby forming the alignment layer; and forming the retardation layer on the alignment layer.

16. A stereoscopic image display device that comprises the optical filter of claim 1.

17. The stereoscopic image display device according to claim 16, wherein the device further comprises an element for displaying images capable of transmitting image signals comprising an image light for a right eye and an image light for a left eye, and a first polarizer that is arranged so that the image signals transmitted from the element for displaying images can enter, and that has an light absorption axis, and wherein the optical filter is arranged so that the image signals transmitted from the element for displaying images can ether therein via the first polarizer.

18. The stereoscopic image display device according to claim 17, wherein the retardation layer of the optical filter comprises at least one first region having an optical axis in a first direction and at least one second region having an optical axis in a second direction that is different from the first direction.

19. The stereoscopic image display device according to claim 18, wherein a bisector of the angle formed by the first and second directions is substantially perpendicular or horizontal to the light absorption axis of the first polarizer.

* * * * *